(12) United States Patent
Cocks et al.

(10) Patent No.: US 11,448,133 B2
(45) Date of Patent: Sep. 20, 2022

(54) MODERATE PRESSURE LIQUID HYDROGEN STORAGE FOR HYBRID-ELECTRIC PROPULSION SYSTEM

(71) Applicant: RaytheonTechnologies Corporation, Farmington, CT (US)

(72) Inventors: Peter Cocks, South Glastonbury, CT (US); Jagadeesh Kumar Tangudu, South Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/213,510

(22) Filed: Mar. 26, 2021

(65) Prior Publication Data

US 2021/0348561 A1 Nov. 11, 2021

Related U.S. Application Data

(60) Provisional application No. 63/020,155, filed on May 5, 2020.

(51) Int. Cl.
*F02C 7/224* (2006.01)
*F02C 3/22* (2006.01)
*F02C 7/36* (2006.01)

(52) U.S. Cl.
CPC ............... *F02C 7/224* (2013.01); *F02C 3/22* (2013.01); *F02C 7/36* (2013.01); *F05D 2220/76* (2013.01); *F05D 2240/35* (2013.01); *F05D 2260/213* (2013.01)

(58) Field of Classification Search
CPC .... F02C 7/224; F02C 7/22; F02C 7/12; F02C 7/14; F02C 7/143; F02C 7/185; F05D 2220/76; F05D 2240/35; F05D 2260/213
See application file for complete search history.

(56) References Cited

U.S. PATENT DOCUMENTS 7,117,663 B2   10/2006  Knapp
9,964,073 B1    5/2018  Pinera et al.
(Continued)

FOREIGN PATENT DOCUMENTS

DE   102017223803 A1   6/2019

OTHER PUBLICATIONS

European Search Report for European Application No. 21172339.0 dated Oct. 1, 2021.

*Primary Examiner* — Todd E Manahan
*Assistant Examiner* — Rodolphe Andre Chabreyrie
(74) *Attorney, Agent, or Firm* — Carlson, Gaskey & Olds, P.C.

(57) ABSTRACT

A turbine engine according to an exemplary embodiment of this disclosure, among other possible things includes, a liquid hydrogen fuel storage tank that is configured to maintain the liquid hydrogen fuel at a pressure greater than an external pressure and less than 20 bar, an electric machine that is in thermal communication with a liquid hydrogen fuel flow from the liquid hydrogen fuel storage tank, the liquid hydrogen fuel flow is configured to maintain at least a component of the electric machine at an operating temperature below an ambient temperature, and a fuel system that is configured to receive gas hydrogen fuel flow and communicate the gas hydrogen fuel flow to a power generation device.

25 Claims, 3 Drawing Sheets

(56) References Cited

U.S. PATENT DOCUMENTS

| | | | |
|---|---|---|---|
| 2012/0167840 A1* | 7/2012 | Miyagawa | F02D 19/0671 |
| | | | 123/3 |
| 2014/0179535 A1* | 6/2014 | Stuckl | B64D 33/08 |
| | | | 505/163 |
| 2017/0370293 A1* | 12/2017 | Burkhardt | F16K 31/007 |
| 2019/0009917 A1* | 1/2019 | Anton | B60L 50/70 |
| 2020/0040846 A1* | 2/2020 | Lugg | F02K 3/072 |
| 2020/0088099 A1 | 3/2020 | Roberge | |
| 2020/0244130 A1* | 7/2020 | Palmer | H01B 12/02 |
| 2021/0301720 A1* | 9/2021 | Staubach | F02C 1/10 |
| 2021/0340908 A1* | 11/2021 | Boucher | F02C 7/224 |
| 2021/0372623 A1* | 12/2021 | Kulkarni | F01D 21/003 |

\* cited by examiner

MODERATE PRESSURE LIQUID HYDROGEN STORAGE FOR HYBRID-ELECTRIC PROPULSION SYSTEM

CROSS-REFERENCE TO RELATED APPLICATIONS

This application claims priority to U.S. Provisional Application No. 63/020,155 filed May 5, 2020.

BACKGROUND

A gas turbine engine typically mixes a carbon based fuel with air within a combustor where it is ignited to generate a high-energy exhaust gas flow. The high-energy exhaust gas flow includes carbon that is eventually exhausted into the environment. Alternative engine structures and fuels may aid in the reduction and/or elimination of carbon emissions. One such fuel includes hydrogen. Hydrogen fuel properties require non-traditional storage structures and systems to practically leverage positive environmental and performance aspects.

Turbine engine manufacturers continue to seek further improvements to engine performance including improvements to environmental impact, thermal transfer and propulsive efficiencies.

SUMMARY

A turbine engine according to an exemplary embodiment of this disclosure, among other possible things includes, a liquid hydrogen fuel storage tank that is configured to maintain the liquid hydrogen fuel at a pressure greater than an external pressure and less than 20 bar, an electric machine that is in thermal communication with a liquid hydrogen fuel flow from the liquid hydrogen fuel storage tank, the liquid hydrogen fuel flow is configured to maintain at least a component of the electric machine at an operating temperature below an ambient temperature, and a fuel system that is configured to receive gas hydrogen fuel flow and communicate the gas hydrogen fuel flow to a power generation device.

In a further embodiment of the foregoing, wherein the power generation device includes a combustor.

In a further embodiment of any of the foregoing, the turbine engine includes a turbo-expander that is configured to be driven by the gas hydrogen fuel flow that is generated from the liquid hydrogen fuel flow. The turbo-expander is disposed downstream of the electric machine.

In a further embodiment of any of the foregoing, the turbo-expander includes a shaft that is coupled to drive a generator.

In a further embodiment of any of the foregoing, the turbo-expander includes a shaft that is coupled to drive a device of the electric machine.

In a further embodiment of any of the foregoing, the electric machine includes a superconducting electric machine.

In a further embodiment of any of the foregoing, the electric machine includes superconducting power distribution cables.

In a further embodiment of any of the foregoing, the electric machine includes an electric motor.

In a further embodiment of any of the foregoing, the turbine engine includes an electronics heat exchanger that is disposed downstream of the electric machine and that is configured to communicate thermal energy from a power electronic system into the hydrogen fuel flow.

In a further embodiment of any of the foregoing, the turbine engine includes a liquid fuel pump that is configured to receive liquid hydrogen fuel flow that is exhausted from the electric machine and raises a pressure of the liquid hydrogen fuel flow to a pressure greater than that within the power generation device.

In a further embodiment of any of the foregoing, the turbine engine includes a waste heat exchanger that is configured to transfer thermal energy into the liquid hydrogen fuel flow.

In a further embodiment of any of the foregoing, the waste heat exchanger is configured to change the liquid hydrogen fuel flow to a gas hydrogen fuel flow and is located before communication of the gas hydrogen fuel flow to a turbo-expander.

In a further embodiment of any of the foregoing, the waste heat exchanger is in thermal communication with a portion of a turbine section.

In a further embodiment of any of the foregoing, the liquid hydrogen fuel storage tank is configured to maintain the liquid hydrogen fuel at a pressure greater than the ambient pressure and less than 17.0 bar.

In a further embodiment of any of the foregoing, the liquid hydrogen fuel storage tank is configured to maintain the liquid hydrogen fuel at a pressure greater than the ambient pressure and less than 13.3 bar.

An energy extraction system according to an exemplary embodiment of this disclosure, among other possible things includes a liquid hydrogen fuel storage tank is configured to store a liquid hydrogen fuel at a pressure greater than an ambient pressure and less than 20 bar, an electric machine in thermal communication with a liquid hydrogen fuel flow that is configured to maintain at least a component of the electric machine at an operating temperature below an ambient temperature, at least one heat exchanger that is in thermal communication with the liquid hydrogen fuel flow and is configured to provide thermal energy to the liquid hydrogen fuel, and an energy conversion device that is configured to use a gas hydrogen fuel flow derived from the liquid hydrogen fuel flow to generate a work output.

In a further embodiment of any of the foregoing, the energy extraction system includes a turbo-expander that is disposed downstream of the at least one heat exchanger and that is configured to expand the gas hydrogen fuel flow to generate an additional portion of the work output.

In a further embodiment of any of the foregoing, the electric machine includes a superconducting generator, and the turbo-expander is coupled to drive the superconducting generator.

In a further embodiment of any of the foregoing, the liquid hydrogen fuel storage tank is configured to maintain the liquid hydrogen fuel at a pressure greater than the ambient pressure and less than 17.0 bar.

In a further embodiment of any of the foregoing, the liquid hydrogen fuel storage tank is configured to maintain the liquid hydrogen fuel at a pressure greater than an ambient pressure and less than 13.3 bar.

A method of operating a turbine engine according to an exemplary embodiment of this disclosure, among other possible things includes storing a liquid hydrogen fuel in a storage tank at a pressure greater than an ambient pressure and less than 20 bar, maintaining an electric machine at an operating temperature below an ambient temperature by thermally communicating a liquid hydrogen fuel flow from the storage tank to at least a component of the electric machine, absorbing heat energy into the liquid hydrogen fuel flow using at least one heat exchanger in thermal communication with a heat source, and generating a work output using a gas hydrogen fuel flow derived from the liquid hydrogen fuel flow.

In a further embodiment of any of the foregoing, the method includes driving a turbo-expander with the gas hydrogen fuel flow to generate the work output.

In a further embodiment of any of the foregoing, the method includes coupling the turbo-expander to a device within the electric machine.

In a further embodiment of any of the foregoing, the device includes a superconducting generator and the turbo-expander.

In a further embodiment of any of the foregoing, the liquid hydrogen fuel flow maintains the superconducting material at an operating temperature between −260 C and −240 C.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
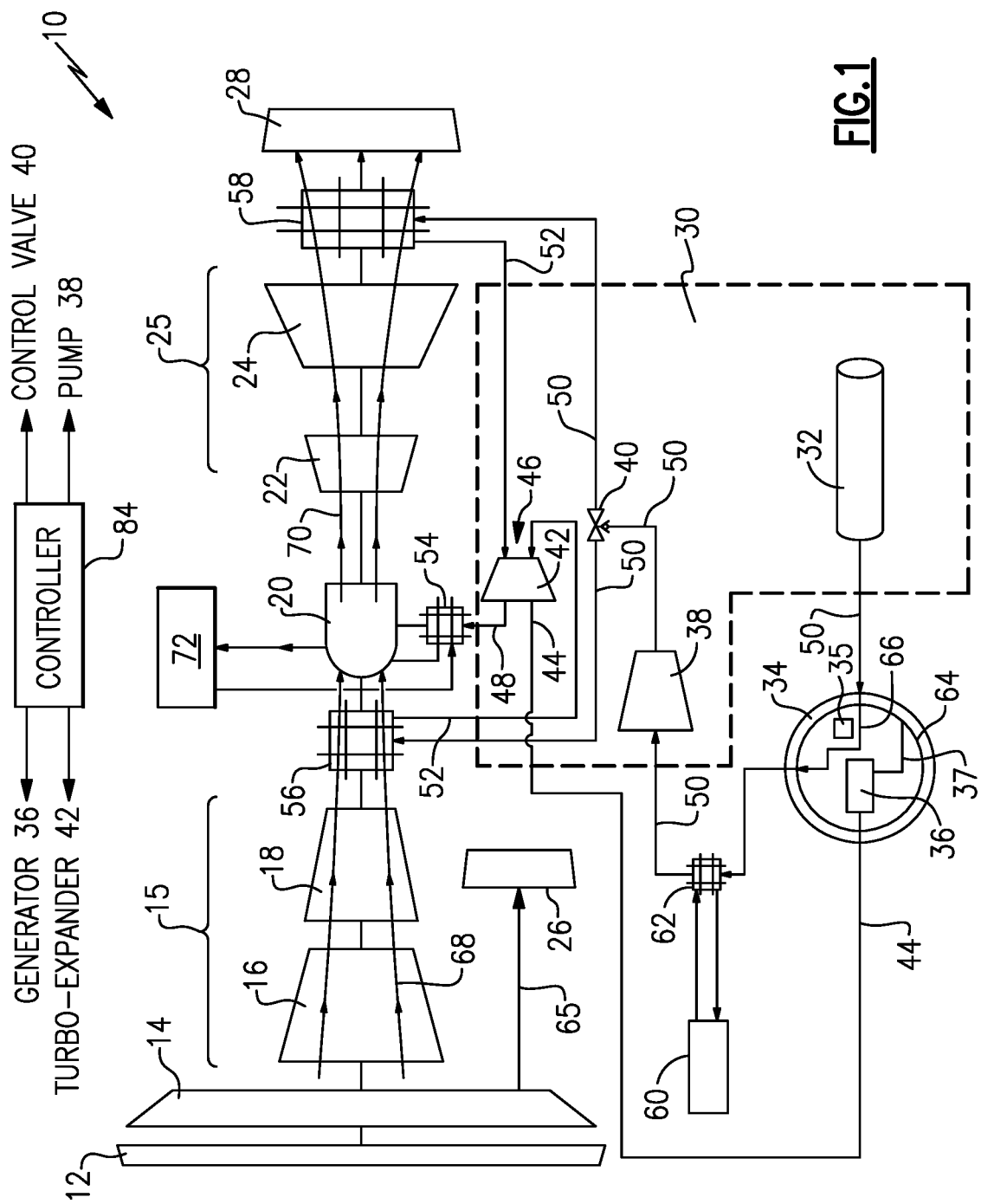
FIG. 1 is a schematic view of an example hydrogen based turbine engine and fuel system.

FIG. 1 schematically illustrates a turbine engine assembly 10 including an example hydrogen based fuel system 30. Hydrogen based fuels are an alternative to carbon based fuels to aid in the reduction of carbon emissions. Hydrogen is a gas at ambient pressures and temperature. Hydrogen is more preferably stored as a liquid for aviation operation. Liquid hydrogen requires storage at temperatures below a critical point that is around −240° C. and a pressure of around 13.3 bars. The decreased temperatures and increased pressures required by the use of hydrogen fuel can be leveraged to provide additional fuel saving technologies. Integration of electric machines in the turbine engine architecture is a technology that may benefit from the use of liquid hydrogen fuels. Efficient superconducting electric machines and components require low temperatures that can be supported by a liquid hydrogen fuel.

The example turbine engine assembly 10 includes a bypass for a bypass airflow 65 driven by a fan 14 driven by a turbine section 25. A portion of air is communicated through an inlet 12 and the fan 14 as a core flow 68 into a compressor section 15. The core flow 68 is compressed and communicated to a combustor 20. In the combustor 20, the core flow 68 is mixed with fuel and ignited to generate a high energy exhaust gas flow 70 that expands through the turbine section 25 to generate shaft power utilized to drive the fan 14 and the compressor section 15.

The fan 14 generates the bypass flow 65 that is exhausted through a fan nozzle 26 and the high energy exhaust gas flow 70 is directed through a core nozzle 28 to produce thrust.

The example turbine engine 10 is 2-spool engine with a low pressure compressor 16 coupled to a low pressure turbine 24 and a high pressure compressor 18 coupled to a high pressure turbine 22. The fan 14 is driven by the low pressure turbine 24. Although a 2-spool turbine engine is schematically shown by way of example, other turbine engine configurations would benefit from and are within the scope and contemplation of this disclosure.

The fuel system 30 supplies a hydrogen based fuel to the combustor 20 to substantially reduce or eliminate carbon emissions. The hydrogen based fuel is stored in a liquid state within a liquid hydrogen storage tank 32. The liquid hydrogen storage tank 32 is sealed from the external environment in that there are no open vents to enable a pressure stabilization with the environment surrounding the storage tank 32. In one disclosed example, the hydrogen fuel is stored at a temperature and pressure that maintain the hydrogen in a liquid state.

Figure 2:
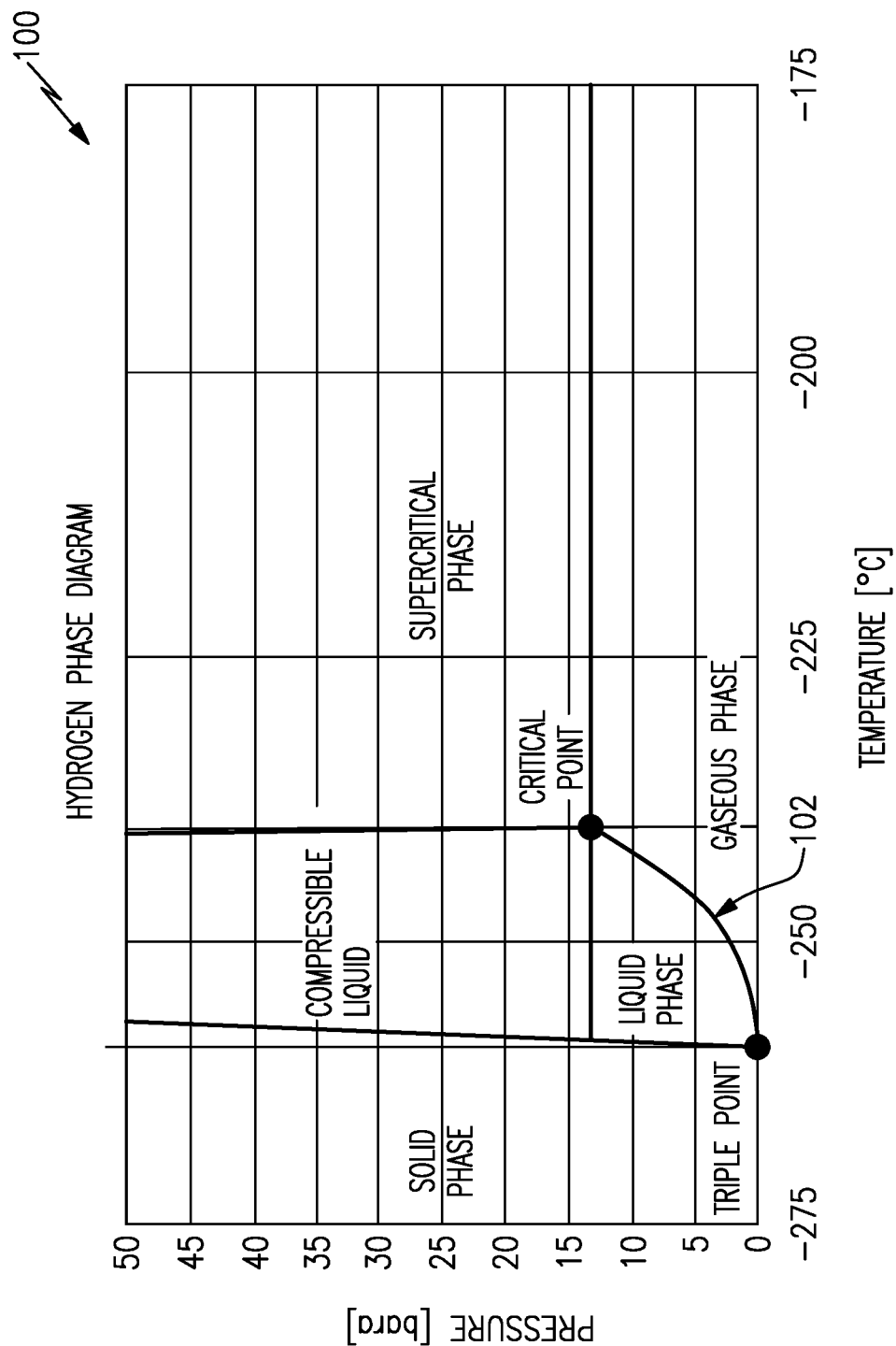
FIG. 2 is a hydrogen phase diagram.

Referring to FIG. 2 with continued reference to FIG. 1, hydrogen phase diagram 100 illustrates phases of hydrogen at different temperatures and pressures. The critical point of hydrogen is 13.3 bar (193 psi) at a temperature of around −240° C. (33° K). At pressures lower than 13.3 bar, the hydrogen remains in liquid form above line 102 between the critical point and the triple point. The hydrogen remains in liquid phase with decreases in pressure from the critical point with decreases in temperature as is illustrated by the line 102. For example, at 13.3 bar, hydrogen is in a liquid form at a temperature of about −240° C. (33° K). However, below 13.3 bar at the same 240° C. (33° K) temperature, the hydrogen changes state into a gaseous phase. At approximately 0.07 bar, hydrogen remains in a liquid form at a temperature of about 260° C. (13° K). At pressures above 13.3 bar, the hydrogen remains in a compressible liquid state at temperatures between −240° C. (33° K) and −260° C. (13° K). Accordingly, to maintain hydrogen in a liquid state, the temperature is maintained between −240° C. (33° K) and −260° C. (13° K) and around 13.3 bar.

Accordingly, both the temperature and pressure need to be within set limits to maintain the hydrogen as a liquid. However, increased pressures require structural features, devices and conduits utilizing for transporting the hydrogen fuel to be increasingly robust. The increased robust structural features can add weight, cost and reduce efficiency gains obtained by utilizing hydrogen fuel. However, at lower pressures, for example, below the critical pressure, small temperature changes can cause a phase shift into gaseous form. The example fuel system 30 maintains the hydrogen at moderate pressures to reduce the weight and cost of structures required to handle hydrogen in a liquid form. The moderate pressures are maintained to facilitate efficient storage, transport and cooling and maintain the hydrogen in a liquid form.

The hydrogen fuel is used to cool other engine systems and that heat is utilized to transform the hydrogen fuel into a gas form prior to combustion to generate the high energy gas flow 70. The disclosed system further includes systems to reclaim a portion of the energy from the hydrogen in gas form.

An electrical machine system 34, shown schematically, includes superconducting components 35, superconducting cables 37 and electric machines that provide efficient operation of electrical devices. The example electric machine system 34 includes a generator 36. In one disclosed embodiment, the generator 36 is a superconducting generator. The superconducting components 35, cables 37 and machines include materials that conduct electricity with low or zero resistance. Superconducting materials within the scope of this disclosure may include metals, ceramics organic materials and any other material that provides substantially low and/or zero electric resistance.

Superconducting properties are realized at temperatures substantially below typical ambient and/or external conditions on-board an aircraft. Accordingly, liquid hydrogen fuel flow 50 is communicated to the system 34 through a system of conduits 66. The conduits 66 place the liquid hydrogen fuel flow into thermal communication with the superconducting components 35, cables 37 and the generator 36 of the system 34. The system 34 includes insulation, schematically shown at 64 to maintain the components 35, cables 37 and generator 36 at the desired operating temperatures. The desired operating temperatures depend on the specific superconducting materials utilized by the components 35, cables 37 and generator 36 and may vary depending on operational requirements. Moreover, although the example components 35 and generator 36 are shown in a common location, the components 35 and generator 36 may be dispersed in different locations with the conduits 66 branching into the various locations as required. For example, the generator 36 is driven by a shaft 44 of a turbo-expander 42 and therefore may be located with the turbo-expander 42. The components 35 may comprise electronics that are located within a controller 84, an aircraft cabin and/or other electronic devices for controlling operation of the turbine engine 10.

As noted above high pressures require increased robustness of structures. Accordingly, the electric machine system 34 would require that the generators, conduits, valves and other control devices that utilize hydrogen to be configured accommodate the higher pressures. Such an increase in pressure capacity and robustness can add weight, cost, complexity and reduce the efficiency gains provided by use of hydrogen fuel. In addition, the use of a high pressure fluid for thermal management of generators and other components can increase weight due to the need to safely contain the increases pressures. Accordingly, the example fuel system 30 maintains the hydrogen fuel at moderate pressures and temperatures.

The example liquid hydrogen fuel storage tank 32 maintains the liquid hydrogen fuel at a pressure greater than the external pressure and less than 13.3 bar. In another disclosed example embodiment, liquid hydrogen fuel is maintained at a pressure greater than ambient and less than about 20 bar. In another disclosed example embodiment, the liquid hydrogen fuel is maintained within the fuel storage tank 32 at a pressure no more than 13.3 bar. In another disclosed embodiment, the liquid hydrogen fuel is maintained with the fuel storage tank at a pressure no more than 17.0 bar. The disclosed pressure ranges are determined to maintain hydrogen in the liquid state at moderate pressures while enabling the use of superconducting components 35, cables 37, and machines 36 with lower pressure capacities and therefore decreased weight and cost.

The fuel storage tank 32 communicates the liquid hydrogen fuel flow 50 first to the superconducting system 34 through conduits 66 to maintain the temperatures of the superconducting components 35 and generator 36. Although the system 34 is well insulated, some heat energy will be absorbed by the liquid hydrogen fuel. However, the heat energy absorbed from the system 34 results in less than about a 20° Kelvin rise in temperature of the liquid hydrogen fuel.

Liquid hydrogen fuel flow 50 exiting the system 34 remains substantially cooler than the ambient environment and components and therefore provides a good heat sink for removing thermal energy from other aircraft and/or engine systems. In this example, the liquid hydrogen fuel flow 50 is placed in thermal communication to cool power electronics 60 by way of heat exchanger 62. Power electronics 60 can include those electrical devices in the controller 84, other electric machines, pumps, valves and electrical actuators that generate thermal energy and operate within a defined temperature range. The amount of thermal energy absorbed by the liquid hydrogen fuel flow 50 is below a threshold that results in transformation into a gas state. In other words, the amount of thermal energy input in the liquid hydrogen fuel is maintained at a level predetermined to maintain the fuel in the liquid state.

The liquid hydrogen fuel flow 50 is communicated to a liquid pump 38. The pump 38 raises a pressure of the liquid hydrogen fuel flow 50 to a pressure at least required for communication into the combustor 20. The core flow 68 is of an elevated pressure and therefore, for the liquid hydrogen fuel flow 50 to be communicated into the combustor, it is pressurized to a pressure greater than that within the combustor 20. The pump 38 is arranged to receive the liquid hydrogen fuel flow 50 after any use in a lower pressure liquid state is completed. The liquid hydrogen fuel flow 50 exhausted from the pump 38 is at a relatively high pressure that is not desired for use in other devices due to the increased structure required of the conduits and control devices.

The high pressure liquid hydrogen fuel flow 50 is communicated to a control valve 40. The liquid hydrogen fuel flow 50 is directed through the control valve 40 to different heat exchangers 56, 58 in thermal communication with core and exhaust gas flows. The thermal energy input into the liquid hydrogen fuel flow 50 through the heat exchangers 56, 58 transforms the liquid hydrogen fuel flow 50 into a gas hydrogen fuel flow 52.

The gas hydrogen fuel flow 52 is then communicated to a turbo-expander 42. The turbo-expander 42 uses energy from the gas hydrogen fuel flow 52 to drive an output shaft 44. The turbo-expander 52 provides for the reclamation of at least a portion of thermal energy generated throughout the engine 20.

In one example, the liquid hydrogen fuel flow 50 is communicated to a fuel/air heat exchanger 56. The fuel/air heat exchanger 56 may cool air communicated to the combustor 20 to improve combustion efficiency.

The liquid hydrogen fuel flow 50 may also be communicated to an exhaust gas heat exchanger 58 to transform the liquid hydrogen fuel flow 50 into a gas hydrogen fuel flow 52. Elevating the temperature of the gas hydrogen fuel flow 52 provides waste heat recovery which improves cycle efficiency. The gas hydrogen fuel flow 52 from both the fuel/air heat exchanger 56 and the exhaust gas heat exchanger 58 is communicated to an inlet 46 of the turbo-expander 42.

Energy from the gas hydrogen fuel flow 52 is extracted by the turbo-expander 42 to drive other engine components. In this disclosed example, the turbo-expander 42 is coupled to the generator 36 through the shaft 44. The high temperature gas hydrogen fuel flow 52 expands through the turbo-expander 42 and exhausted through outlet 48 at a pressure that is still sufficient for communication into the combustor 20. The increased pressure is provided by the pump 38 and heating in the heat exchangers 56, 58. Some portion of energy contained in the high pressure gas hydrogen gas flow 52 is extracted by the turbo-expander 42 to offset any inefficiencies resulting in the increased structures needed to handle and store the hydrogen fuel.

The gas hydrogen fuel flow 52 may absorb further thermal energy in a waste heat recovery heat exchanger 54 downstream of the turbo-expander 42. The heat recovery heat exchanger 54 is used to cool other engine systems 72 and further heat the gas hydrogen fuel flow 52. In one disclosed embodiment, the engine system 72 may be a lubricant system, an air cooling system and/or any other combination of heat producing systems that benefit from cooling and that can input additional thermal energy to heat the fuel. As appreciated, because the gas hydrogen fuel flow does not contain carbon, the available thermal capacity for absorbing thermal energy is not limited by coking and carbon deposition on fuel component parts.

The gas hydrogen fuel flow 52 exiting the heat exchanger 54 is communicated to the combustor 20 where it is mixed with compressed air from the core flow 68 and ignited to generate the high energy exhaust gas flow 70. The high energy gas flow 70 expands through the turbine section 25 to generate shaft power used to drive the compressor section 15 and the fan to produce engine thrust.

The controller 84 is in control communication with components of the turbine engine 10 including the features of the fuel system 30. The controller 30 governs actuation of the pump 38 turbo-expander 42, generator 36 and the control valve 40, among other possible components to provide fuel flow to the combustor 20 as desired for current engine operating conditions.

Figure 3:
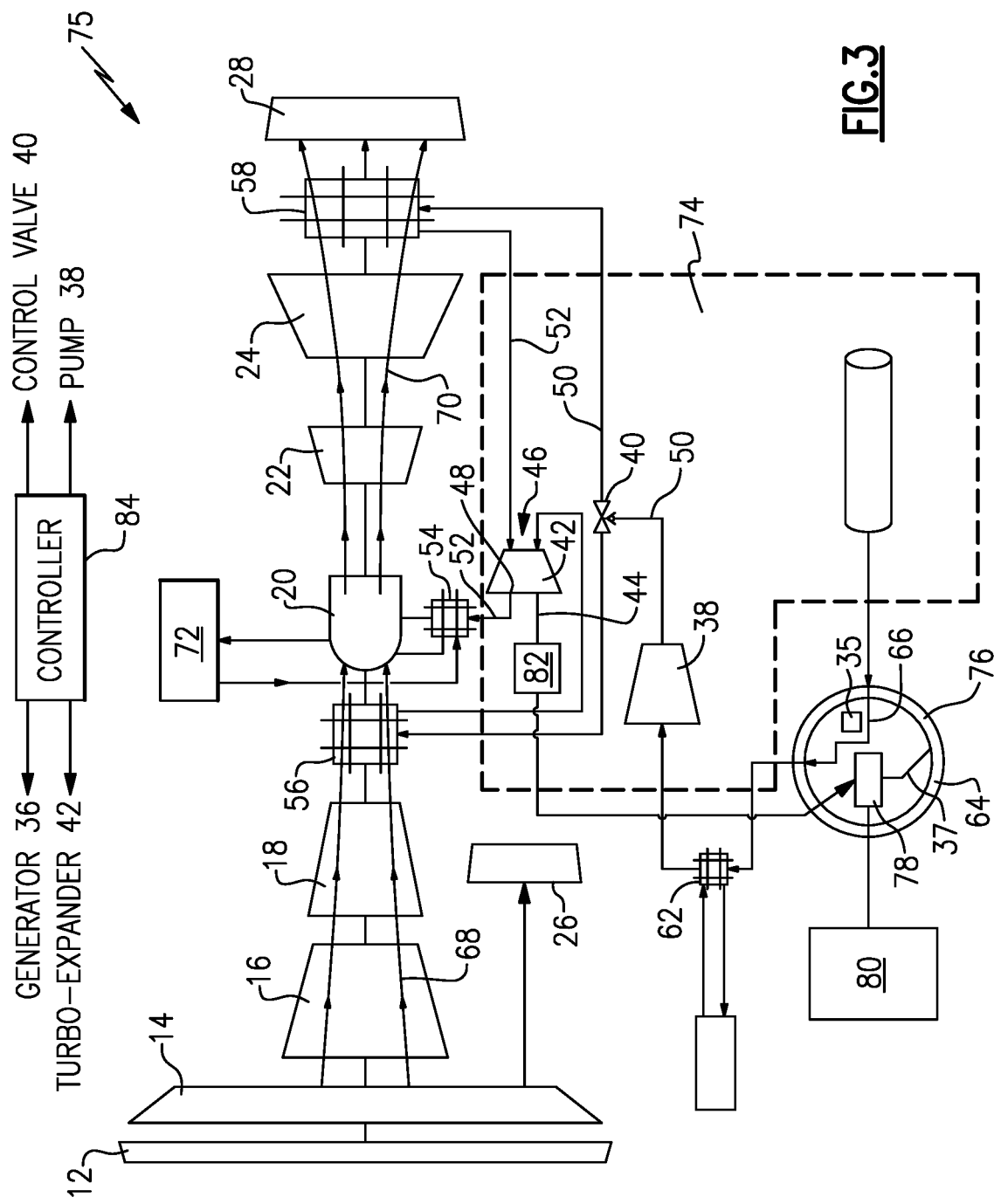
FIG. 3 is a schematic view of another example hydrogen based turbine engine and fuel system.

Referring to FIG. 3, another turbine engine 75 is shown that includes fuel system 74 and electric machine system 76. The example fuel system 74 operates substantially as described with regard to the system 30 shown in FIG. 1. In the fuel system 74, the turbo-expander 42 is not coupled to drive a generator within the electric machine system 76. In this disclosed example, the machine system 76 includes an electric motor 78. The example electric motor 78 includes superconducting components to provide a desired electrical efficiency. The turbo-expander 42 drives a generator 82 that provides electric power to the electric motor 78. The electric motor 78 drives components of a system 80. The system 80 could include accessory components for operation of the engine 10, such as for example lubrication and/or cooling air systems. Moreover, the system 80 could represent other integrated components of the engine 75.

In one disclosed example, the electric motor 78 is a superconducting electric motor. Additionally, the generator 82 may also be a superconducting electric generator and be disposed as part of the system 74.

Accordingly, the example engines 10, 75 and hydrogen based fuel systems 30, 74 leverage properties of hydrogen based fuels to offset increased structural requirements to provide increased engine efficiencies while eliminating carbon emissions.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine, comprising:
   a liquid hydrogen fuel storage tank configured to maintain a liquid hydrogen fuel at a pressure greater than an ambient pressure and less than 20 bar;
   an electric machine in thermal communication with a liquid hydrogen fuel flow from the liquid hydrogen fuel storage tank, the liquid hydrogen fuel flow configured to maintain at least a component of the electric machine at an operating temperature below an ambient temperature;
   a fan in flow communication with a compressor section that compresses inlet airflow from the fan and communicates a compressed core airflow to a combustor section where the compressed core airflow is mixed with fuel and ignited to generate a high energy exhaust gas flow that is expanded through a turbine section;
   a fuel/air heat exchanger disposed downstream of a high pressure compressor of the compressor section and upstream of the combustor section, the fuel/air heat exchanger configured to cool the compressed core airflow with the liquid hydrogen fuel flow; and
   a fuel system configured to receive a gas hydrogen fuel flow and communicate the gas hydrogen fuel flow to the combustor section.

2. The turbine engine as recited in claim 1, including a turbo-expander configured to be driven by the gas hydrogen fuel flow generated from the liquid hydrogen fuel flow, the turbo-expander disposed downstream of the electric machine.

3. The turbine engine as recited in claim 2, wherein the turbo-expander includes a shaft coupled to drive a generator included as part of the electric machine.

4. The turbine engine as recited in claim 2, wherein the turbo-expander includes a shaft coupled to drive a device of the electric machine.

5. The turbine engine as recited in claim 1, wherein the electric machine includes a superconducting electric machine.

6. The turbine engine as recited in claim 1, wherein the electric machine includes superconducting power distribution cables.

7. The turbine engine as recited in claim 1, wherein the electric machine includes an electric motor.

8. The turbine engine as recited in claim 1, including an electronics heat exchanger disposed downstream of the electric machine and configured to communicate thermal energy from a power electronic system into the hydrogen fuel flow.

9. The turbine engine as recited in claim 1, including a liquid fuel pump configured to receive liquid hydrogen fuel flow exhausted from the electric machine and raise a pressure of the liquid hydrogen fuel flow to a pressure greater than that within the combustor.

10. The turbine engine as recited in claim 1, including an exhaust gas exchanger in thermal communication with the high energy exhaust gas flow, the exhaust gas heat exchanger configured to transform the liquid hydrogen fuel flow into a gas hydrogen flow.

11. The turbine engine as recited in claim 1, wherein the exhaust gas heat exchanger is located before communication of the gas hydrogen fuel flow to a turbo-expander.

12. The turbine engine as recited in claim 1, wherein the exhaust gas heat exchanger is in thermal communication with a portion of the turbine section.

13. The turbine engine as recited in claim 1, wherein the liquid hydrogen fuel storage tank is configured to maintain the liquid hydrogen fuel at a pressure greater than the ambient pressure and less than 17.0 bar.

14. The turbine engine as recited in claim 1, wherein the liquid hydrogen fuel storage tank is configured to maintain the liquid hydrogen fuel at a pressure greater than the ambient pressure and less than 13.3 bar.

15. The turbine engine as recited in claim 1, further including a control valve configured for directing liquid hydrogen flow between the fuel/air heat exchanger and the exhaust gas heat exchanger.

16. An energy extraction system, comprising:
a liquid hydrogen fuel storage tank configured to store a liquid hydrogen fuel at a pressure greater than an ambient pressure and less than 20 bar;
an electric machine in thermal communication with a liquid hydrogen fuel flow configured to maintain at least a component of the electric machine at an operating temperature below an ambient temperature;
at least one heat exchanger in thermal communication with the liquid hydrogen fuel flow and configured to provide thermal energy to the liquid hydrogen fuel, the at least one heat exchanger includes a fuel/air heat exchanger and a waste heat exchanger; and
a combustor section of a gas turbine engine configured to use a gas hydrogen fuel flow derived from the liquid hydrogen fuel flow to generate a work output, wherein the fuel/air heat exchanger is disposed upstream of the combustor section and is configured to cool a core airflow communicated from a high pressure compressor section located upstream to the fuel/air heat exchanger and the waste heat exchanger is disposed downstream of the combustor section and configured to change the liquid hydrogen fuel into the gas hydrogen fuel flow.

17. The energy extraction system as recited in claim 16, including a turbo-expander disposed downstream of the at least one heat exchanger and configured to expand the gas hydrogen fuel flow to generate an additional portion of the work output.

18. The energy extraction system as recited in claim 17, wherein
the electric machine includes a superconducting generator, and
the turbo-expander is coupled to drive the superconducting generator.

19. The energy extraction system as recited in claim 16, wherein the liquid hydrogen fuel storage tank is configured to maintain the liquid hydrogen fuel at a pressure greater than the ambient pressure and less than 17.0 bar.

20. The energy extraction system as recited in claim 16, wherein the liquid hydrogen fuel storage tank is configured to maintain the liquid hydrogen fuel at a pressure greater than an ambient pressure and less than 13.3 bar.

21. A method of operating a turbine engine, comprising:
storing a liquid hydrogen fuel in a storage tank at a pressure greater than an ambient pressure and less than 20 bar; maintaining an electric machine at an operating temperature below an ambient temperature by thermally communicating a liquid hydrogen fuel flow from the storage tank to at least a component of the electric machine;
cooling a core airflow with a fuel/air heat exchanger in thermal communication with the liquid hydrogen fuel flow and located downstream of a high pressure compressor section and upstream of a combustor section;
absorbing heat energy into the liquid hydrogen fuel flow using a waste heat exchanger in thermal communication with a heat source to transform the liquid hydrogen fuel flow into a gas hydrogen fuel flow; and
generating a work output using the gas hydrogen fuel flow derived from the liquid hydrogen fuel flow.

22. The method as recited in claim 21, including driving a turbo-expander with the gas hydrogen fuel flow to generate the work output.

23. The method as recited in claim 22, including coupling the turbo-expander to a device within the electric machine.

24. The method as recited in claim 23, wherein the device includes a superconducting generator.

25. The method as recited in claim 24, wherein the liquid hydrogen fuel flow maintains the superconducting material at an operating temperature between −260 C and −240 C.

* * * * *